United States Patent [19]

Guidoboni et al.

[11] Patent Number: 4,722,309
[45] Date of Patent: Feb. 2, 1988

[54] INTERNAL COMBUSTION ENGINE

[75] Inventors: Enzo Guidoboni; Paolo Guidoboni; Sergio Guidoboni, all of Bologna, Italy

[73] Assignee: Laerte Guidoboni, Italy

[21] Appl. No.: 638,232

[22] Filed: Aug. 6, 1984

Related U.S. Application Data

[63] Continuation-in-part of Ser. No. 373,284, Apr. 29, 1982, Pat. No. 4,463,566.

[30] Foreign Application Priority Data

Apr. 29, 1981 [IT] Italy .................. 3414 A/81

[51] Int. Cl.⁴ .............................................. F02B 19/08
[52] U.S. Cl. ................................. 123/251; 123/169 EL;
                                    123/280; 123/500; 60/598
[58] Field of Search ................. 123/65 BA, 65 B, 65 E, 123/257, 169 EL, 668, 502, 65 V, 65 VB, 432, 251, 252, 270, 255, 280, 260, 500, 501, 504, 506, 458, 254; 60/605, 604, 613, 599, 598, 607, 608; 417/218

[56] References Cited

U.S. PATENT DOCUMENTS

| | | | |
|---|---|---|---|
| 2,210,067 | 8/1940 | Cummins | 123/504 |
| 2,436,079 | 2/1948 | Shipp | 123/504 |
| 2,731,004 | 1/1956 | Hopkins | 123/65 VB |
| 2,858,666 | 11/1958 | Fullemann | 123/65 BA |
| 3,062,199 | 11/1962 | Brueder | 123/65 BA |
| 3,469,393 | 9/1969 | Tryhorn | 123/65 BA |
| 3,680,305 | 8/1972 | Miller | 123/65 BA |
| 3,927,530 | 12/1975 | Braun | 60/607 |
| 3,999,529 | 12/1976 | Davis | 123/506 |
| 4,028,892 | 6/1977 | Hinkle | 123/65 BA |
| 4,041,922 | 8/1977 | Abe et al. | 123/260 |
| 4,074,671 | 2/1978 | Pennila | 123/668 |
| 4,126,106 | 11/1978 | Witzky | 123/270 |
| 4,162,662 | 7/1979 | Melchior | 123/65 BA |
| 4,232,642 | 11/1980 | Yamaguchi et al. | 123/422 |
| 4,300,497 | 11/1981 | Webber | 123/270 |
| 4,332,224 | 6/1982 | Latsch et al. | 123/260 |
| 4,380,978 | 4/1983 | Maynard et al. | 123/270 |
| 4,580,540 | 4/1986 | Babitzka et al. | 123/458 |

FOREIGN PATENT DOCUMENTS

| | | | |
|---|---|---|---|
| 2309916 | 10/1974 | Fed. Rep. of Germany | 123/504 |
| 2808147 | 8/1979 | Fed. Rep. of Germany | 60/608 |
| 571426 | 8/1945 | United Kingdom | 60/608 |
| 800263 | 8/1958 | United Kingdom | 60/608 |
| 2009842 | 6/1979 | United Kingdom | 123/506 |
| 0661127 | 5/1979 | U.S.S.R. | 60/608 |

OTHER PUBLICATIONS

Edward F. Obert, Internal Combustion Engines, 1968, p. 551.

Primary Examiner—E. Rollins Cross
Assistant Examiner—David A. Okonsky
Attorney, Agent, or Firm—King and Schickli

[57] ABSTRACT

The internal combustion engine performs the thermodynamic cycle partially inside the cylinder, with the piston connected to the crankshaft, and partially in a turbo blower in which there takes place the final stage of the expansion of the burnt gases and, simultaneously, the suction and the first phase of compression of the air. The said compression is completed afterwards in the cylinder, continuously and without any partialization.

12 Claims, 36 Drawing Figures

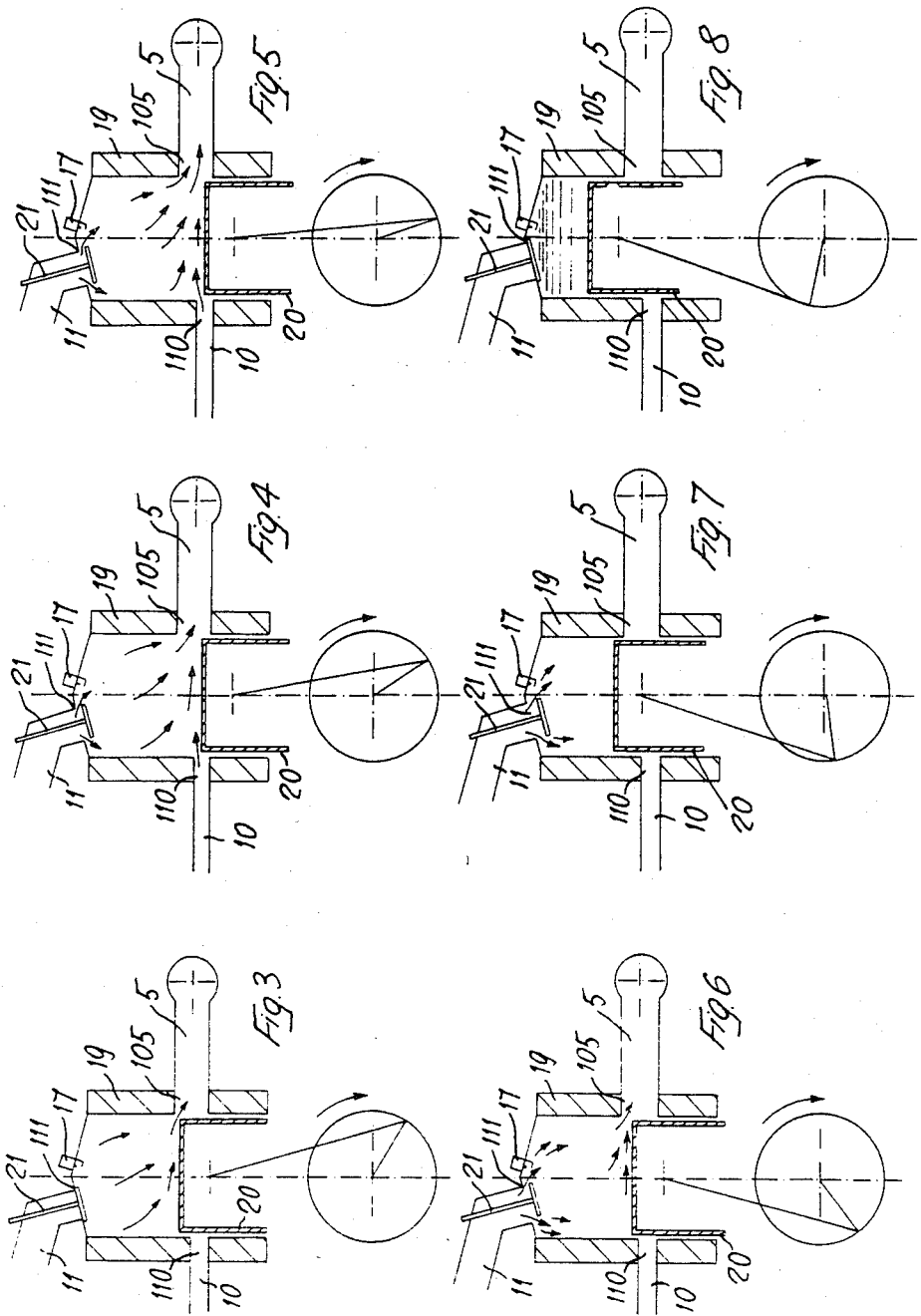

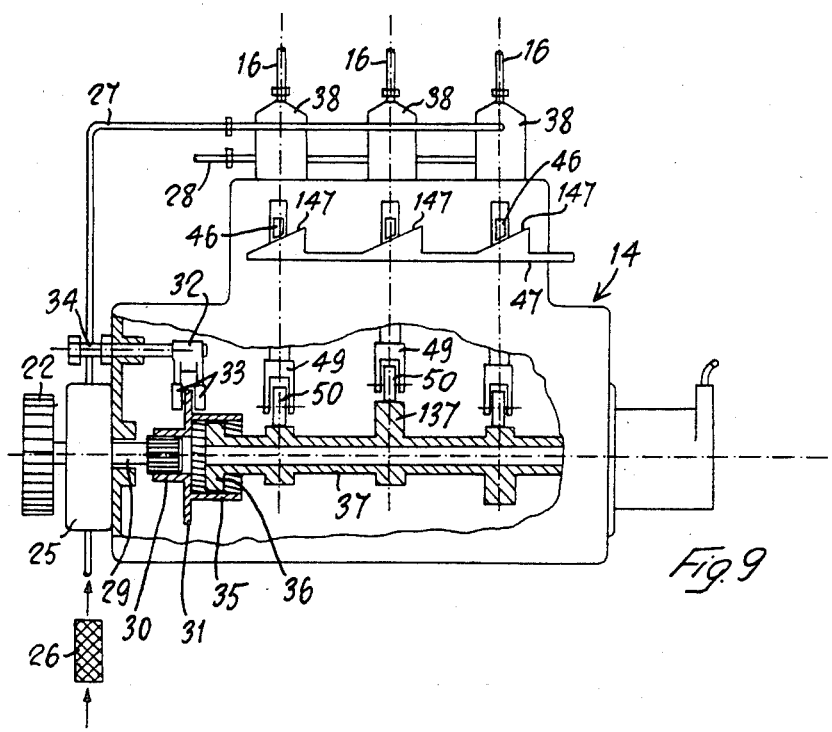
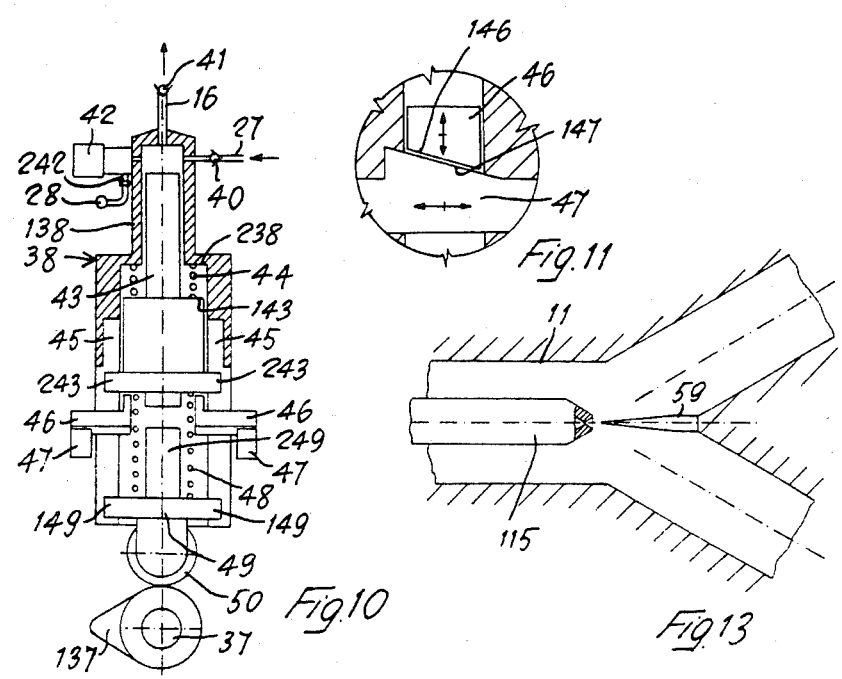

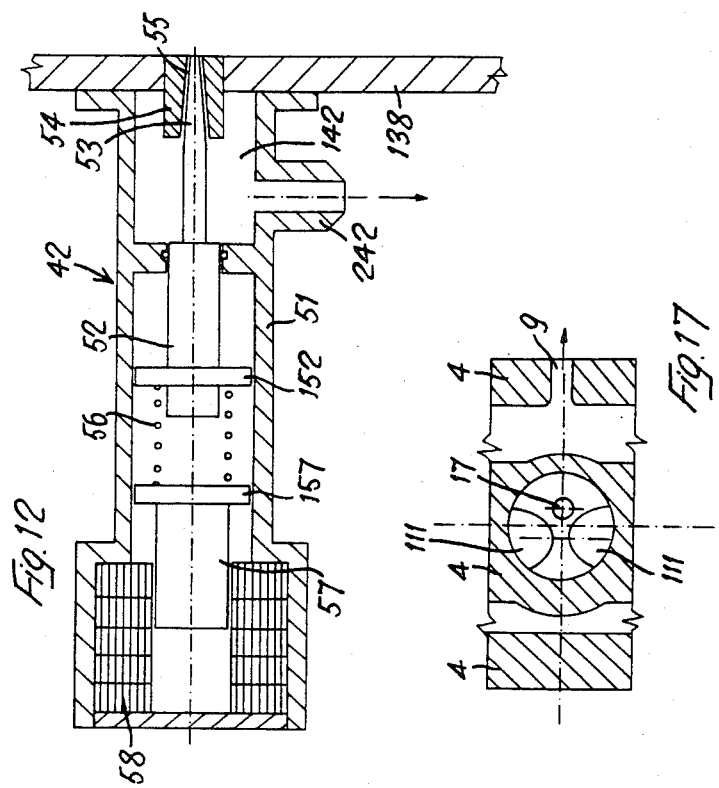
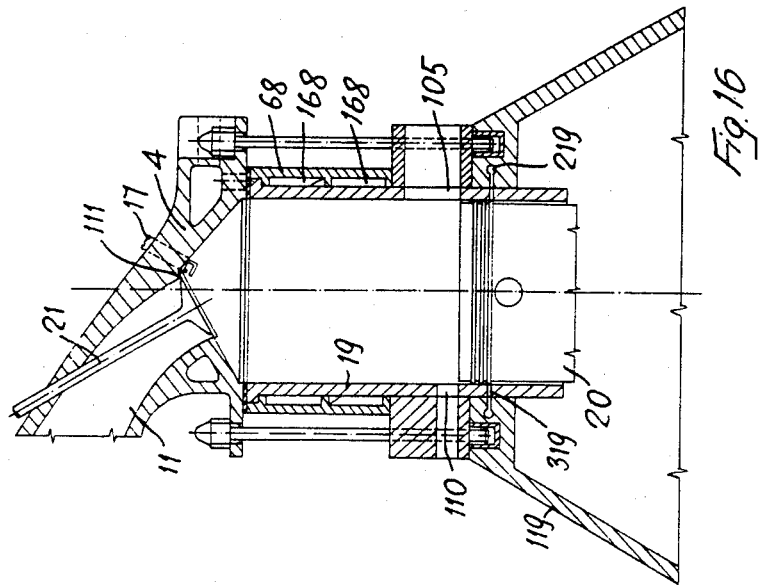

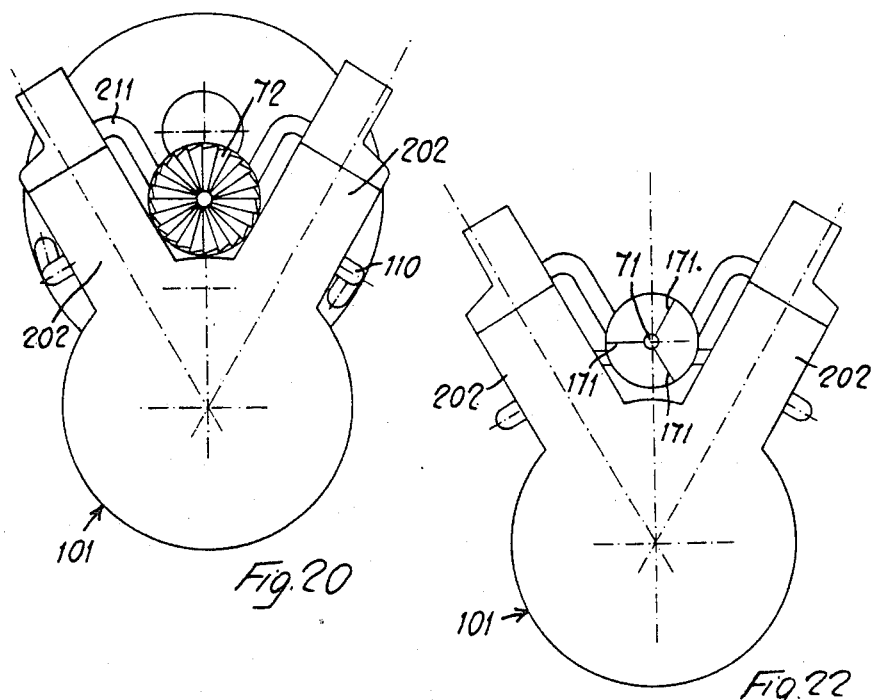
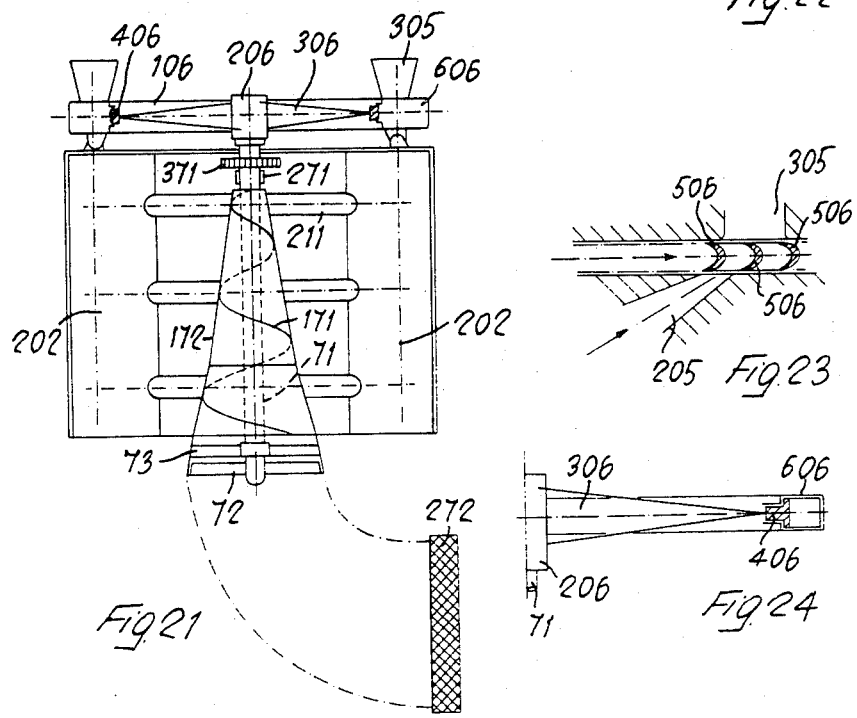

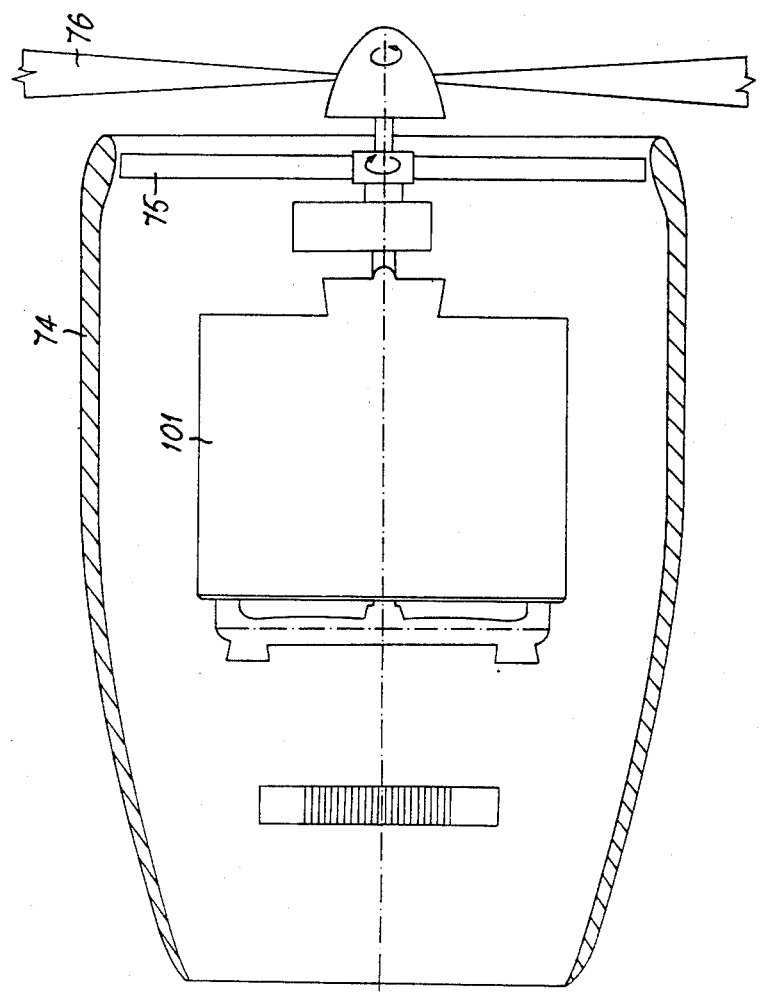

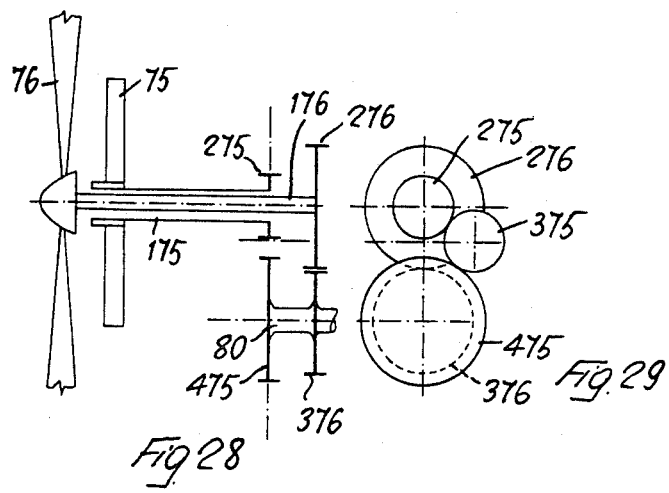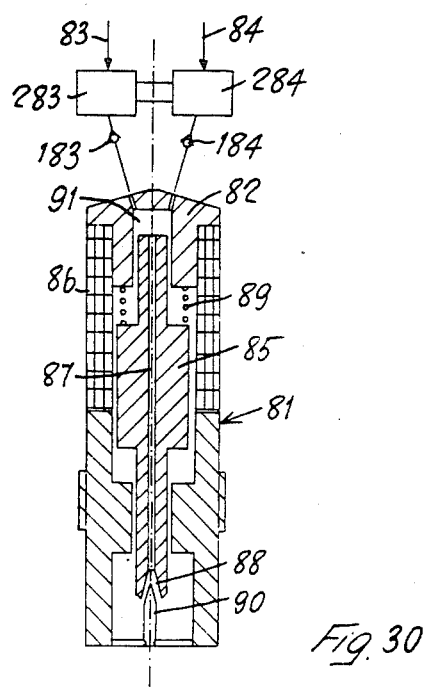

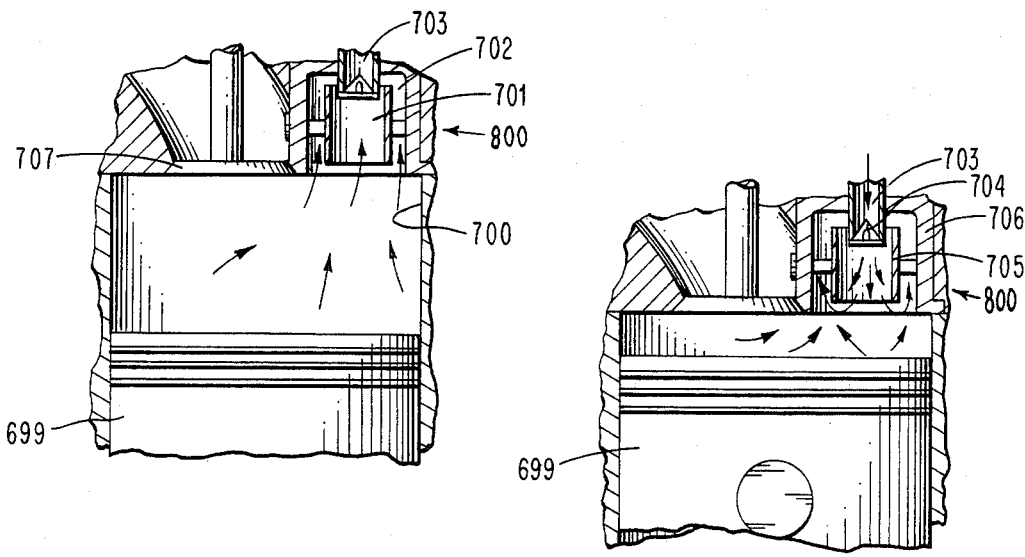
Fig. 33
Fig. 34
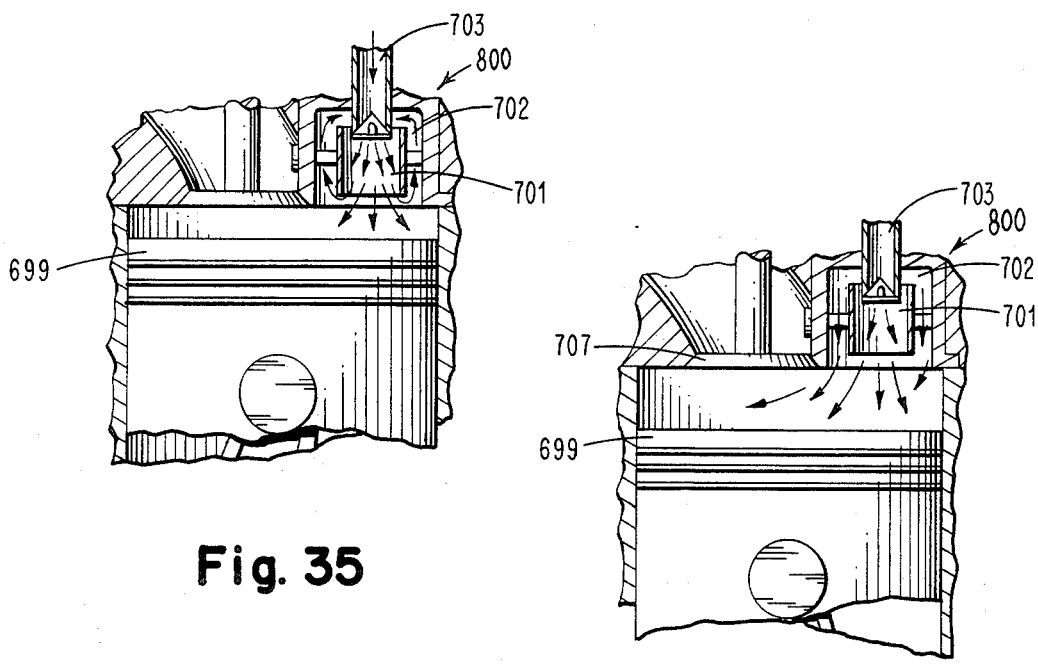
Fig. 35
Fig. 36

INTERNAL COMBUSTION ENGINE

This application is a continuation-in-part of Ser. No. 373,284, filed Apr. 29, 1982 and now U.S. Pat. No. 4,463,566.

The present invention relates to internal combustion engines, and more particularly to an internal combustion engine presenting a new advantageous manner of performing the thermodynamic cycle.

The said thermodynamic cycle is performed partially inside the cylinder, with the piston connected to the crankshaft, and partially in a turbo-supercharger in which there takes place the final phase of the expansion and of the exhaust, simultaneously with the suction of air and with the first part of the compression phase.

The two operating machines (piston and cylinder machine, and supercharger machine) are connected by means of a particular exhaust manifold, for the part of the cycle concerning the expansion phase, and by means of a particular inlet and scavenging manifold for the part concerning the compression phase. The two connecting manifolds present the characteristic feature of not being partialized, so that both the expansion and the simultaneous compression start in one machine and terminate in the other. The flow of fluids in the alternating machine is at any time and at any point unidirectional.

The purpose of the invention is to obtain: a higher thermodynamic output at all speeds, both in the case of fuels ignited by spark, and in the case of spontaneous ignition fuels; a higher ratio power/piston displacement; a lesser amount of mechanical losses; a lesser percentage of pollutant gases at the exhaust. The mentioned scopes will be better evidenced by the detailed description of the modes according to which the phases of the cycle are performed, and of the preferred constructive embodiments of some components, by way of non-limiting example.

The main characteristic features of the engine according to the invention can be summarized as follows:

Stratification of the air-and-fuel mixture in the literal meaning of the word, i.e. a continuous variation of the ratio air/fuel inside a single container (the combustion chamber) with a progressive decrease of said ratio upon nearing to the point where the ignition is started.

The particular injection system of the fuel permits the formation of the mixture at the interior of the inlet duct with the two components (air and fuel) which are moving and present such directions (at increasing or decreasing speeds for both components) that they mix intimately without the creation of vortexes and the thus formed mixture is admitted into the cylinder, by contacting the burnt gases when the respective pressures (of the mixture and of the gases) are almost equal, so that there is no mixing between the two fluids and, since the pressure of the burnt gases at the interior of the cylinder progressively decreases, the mixture pushes them out of the cylinder through the exhaust ports, in which direction they were already moving. In this manner the exhaust of the gases is accelerated, thus obtaining a perfect scavenging because there is no mixing between the gases and the inflowing mixture, but a substitution of this latter in their place, without the formation of vortexes so that the mixture which enters subsequently practically places itself over the mixture which entered previously: consequently, if the mixture which entered subsequently is richer than the prior mixture, at the interior of the cylinder there are formed layers of mixture having different composition, which layers will be compressed by the piston in its up-stroke, after the closure (by the same piston) of the exhaust ports.

The mixture which is formed in the inlet duct, thanks to the particular system of compression and injection of the fuel, is formed in such a manner that the first mixture entering the cylinder is poor and it then progressively gets richer, so that the last portion entering into the cylinder presents a relative ratio equal to 1.

In this manner, it is possible to increase the compression ratio because the limit of self-detonation is raised without excessively reducing the combustion speed; also because the decrease of the precentage of fuel is progressive in the direction away from the ignition point; and finally because the particular shape of the combustion chamber permits to arrange the point of ignition in proximity to the center of the combustion chamber.

A high pressure prior to the starting of the ignition can be obtained also at speeds at which the fuel injection is reduced, in consideration of the fact that precisely in this case during the first phase of opening of the inlet ports there is admitted into the cylinder just air, while the mixture is admitted during a second phase.

A lower dispersion of heat through the walls is obtained thanks to the vigorous action of the fresh scavenging air which sweeps away the combustion gases; this sweeping action is particularly efficaceous with respect to the crown of the cylinder, as it will be seen after.

Finally, a particular characteristic feature consists in the provision of an electronic central unit which continuously receives informations about all the variable functions which influence (directly or indirectly) the operative cycle and the global output of the engine, and consequently programmes and controls the operation of the systems and devices which concur to the highest efficiency of the engine, such as for example:

(1) Ignition of the mixture with a strong and constant electric spark at the correct time;

(2) Formation of the mixture with variation of the amount of fuel depending upon the pressure and temperature of the air and the temperature of the cylinder head;

(3) Automatic regulation of the cooling system;

(4) Automatic regulation of the temperature of the lubricating oil;

(5) Starting of the electric motor of the turbo-supercharger upon starting of the vehicle, disconnection of said motor and re-insertion of same whenever required at critical moments;

(6) Regulation of the pressure and of the temperature in the inlet manifold;

(7) Automatic programmed starting of the motor.

The above and other features of the invention, as well as the advantages deriving therefrom, will appear evident from the following detailed desription of some preferred embodiments, made with reference to the attached drawings, in which:

FIGS. 3 to 8 are diagrammatic views illustrating the cycle of the engine.

FIG. 9 is a side view with parts in section of the fuel injection apparatus.

FIG. 10 is a longitudinal section of an injection cylinder.

FIG. 11 is a detail in enlarged scale of the injection cylinder of FIG. 10.

FIG. 12 is a longitudinal section through a fuel discharge valve.

FIG. 13 is a detail, with parts in section, illustrating the fuel nozzle.

FIG. 16 is a vertical section through the cylinder block and cylinder head, relating one cylinder.

FIG. 17 is a horizontal section through the cylinder head, relating to one cylinder.

FIG. 20 is a diagrammatic front view of a supercharger installed on an engine with cylinders in V-disposition.

FIG. 21 is a diagrammatic top view of the supercharger and engine of FIG. 20.

FIG. 22 is a diagrammatic vertical front section of the supercharger and engine of FIG. 20.

FIGS. 23 and 24 are details showing different component parts of the supercharger of FIG. 20.

FIG. 25 is ia diagrammatic longitudinal section showing a ducted engine as applied on aircrafts.

FIGS. 28 and 29 are diagrammatic views showing, respectively from the side and from the front, the drive gear for the counter-rotating propellers of a ducted engine of aircraft.

FIG. 30 is a longitudinal section through an electroinjector for the injection of fuel or air in the inlet ducts.

FIGS. 31 through 36 are illustrative of a seperate insulated combustion chamber for generating and burning a fuel mixture.

Figure 1:
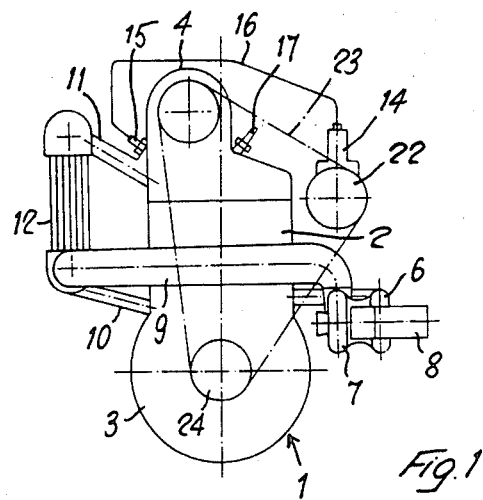
FIG. 1 is a front elevation view of the engine according to the invention.
Figure 2:
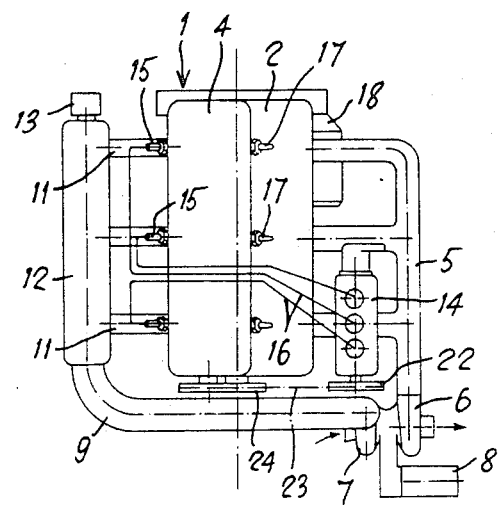
FIG. 2 is a view from the top of the same engine.
Figure 14:
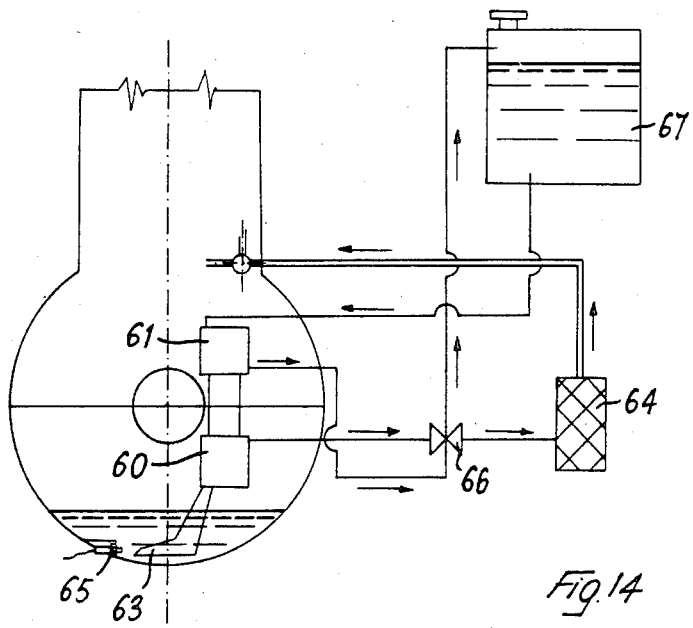
FIG. 14 is a diagram of the circuit of the lubrication system.
Figure 15:
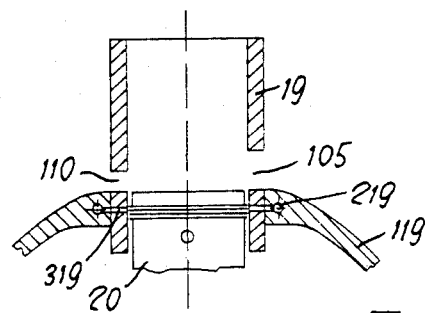
FIG. 15 is a diagrammatic side section illustrating the cooling of a piston.
Figure 19:
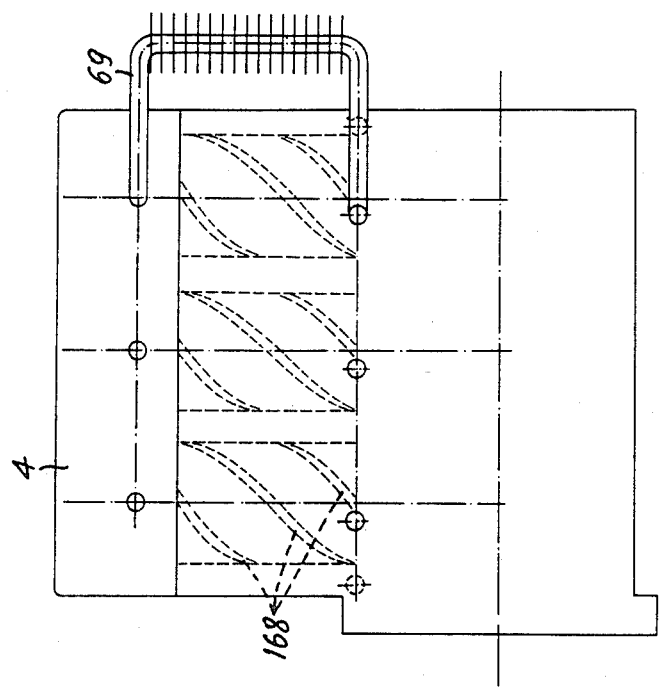
FIG. 19 is a diagrammatic view showing the cooling of the cylinders.
Figure 18:
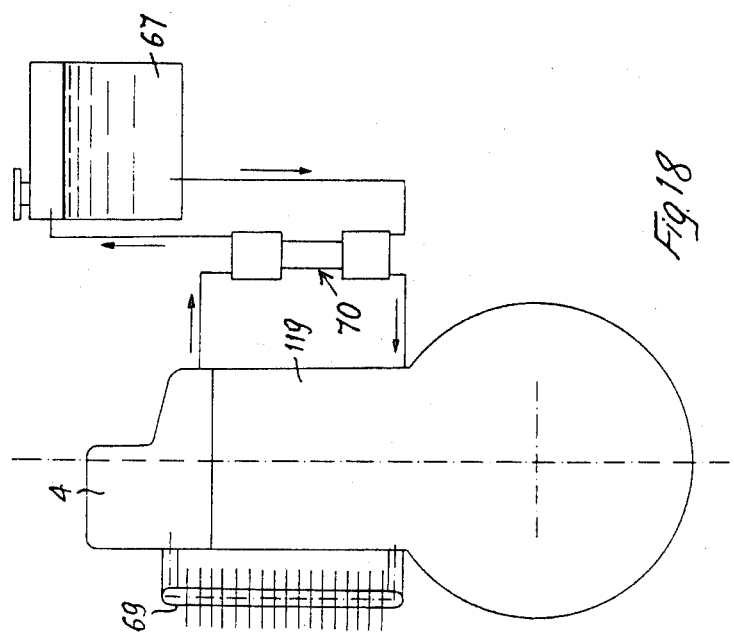
FIG. 18 is a diagram of the circuit of the cooling system.

In FIGS. 1 and 2 there is illustrated, by way of nonlimiting example, an internal-combustion engine 1 according to the invention, of the two-stroke-cycle type and presenting three cylinders in line. As usual, the main structural member of the engine 1 is represented by the cylinder block 2 with a lower crankcase 3 and an upper cylnder head 4. The exhaust manifold 5 branches off from the cylinder block 2 and is connected to a turbosupercharger comprising a turbine 6, a blower 7 and an electric motor 8. The blower 7 of the turbosupercharger is connected to the inlet and scavenging manifold 9 which branches off into the signal scavenging ducts 10 and inlet ducts 11. A heat exchanger 12 is connected to the inlet manifold 9 for cooling the air from the blower 7. At the extremity of the inlet manifold, preferably after the heat exchanger 12, there is provided the air valve 13, for controlling and limiting the pressure in the said inlet manifold. Reference numeral 14 indicates the fuel injection apparatus which feeds the fuel to the injectors 15 through the pipes 16. On the cylinder head there are also arranged the spark plugs 17. The engine is completed by a conventional electric starting motor 18.

The two-stroke cycle of the engine according to the invention is diagrammatically represented in FIGS. 3 to 8, where there is shown a single cylidner 19 at the interior of which slides the piston 20. The scavenging air is admitted through the duct 10, and the exhaust gases are discharged through the duct 5 of the exhaust manifold. The air-and-fuel mixture is admitted through the inlet duct 11 and the inlet 111 port is controlled by the valve 21 while the spark plug 17 provides to the ignition of the compressed mixture.

The final phase of the expansion of the gases in the power stroke is illustrated in Fgiure 3, where the gases, by completing the combustion, start moving towards the exhaust ports 105 of the exhaust duct 5. In FIG. 4 the piston 20 starts to uncover the scavenging ports 110 so that the air under pressure in the scavenging duct 10 comes firstly in contact with the gases contained in the cylinder and after, consequently to the pressure drop at the interior of the cylinder itself, the said scavenging air enters into the cylinder 19 pushing ahead towards the exhaust ports the combustion gases which were already moving in that direction. Immediately thereafter, as shown in FIG. 5, the inlet valve 21 starts opening so that the air-and-fuel mixture formed in the inlet duct 11 is admitted through inlet pot 111 into the cylinder 1 whenever the two pressures, of the mixture and of the gases, are almost equal, and consequently the mixture gradually starts to push ahead the gases, taking their place and accelerating their motion towards the exhaust ports, where they were already directed, in a progressive manner, since the decrease of the pressure of the gases is progressive while the pressure of the mixture is practically constant.

Up to this moment through the exhaust ports there are discharged just burnt gases, in case that the intake took place with a full charge of fuel. In the prosecution of the cycle (see FIG. 6) from the upper section of the exhasut ports the burnt gases continue to flow out, while scavenging air continues to flow into the cylinder from the scavenging ports 110 which are still partially open, and flows out through the lower section of the exhasut ports 105 after having lapped the crown of the piston 20, thus cooling same in a vigorous manner.

FIG. 7 shows the last phase of the intake, during which also the exhaust ports 105 are covered, while the inlet valves are still open, thus permitting the inlet of the richer terminal or "tail" portion of the flow of mixture, which enters into the cylinder when the difference between the outer and inner pressure is minimum and the inlet valve 21 is about to be closed so that the said tail portion of the mixture does not move very far from the inlet valve 21 and it remains in the upper portion of the combustion chamber, which leads to its compression (see FIG. 8) in close proximity to the spark plug 17. The above takes place during the upward stroke of the piston 20, when there are no internal movements of gases, and consequently the various layers of mixture are displaced parallelly to the crown surface of the piston 20, thus reducing the total height of the compressed mixture but in any case leaving unaltered its stratification.

The combustion gases and the scavenging air which flow out of the cylinder enter into the exhaust manifold without being partialized (subdivided) or deviated at their discharge, and are conveyed to the turbine 6 (FIGS. 1 and 2) where, as it will be seen after, they complete their expansion prior to being finally discharged into the atmosphere through the exhaust pipe.

The exhaust gases can complete their combustion in the exhaust manifold in consideration of the fact that they decrease in temperature of a small amount and they come into contact with the fresh scavenging air.

The turbine 6 (FIGS. 1 and 2) promotes the rotation of the blower 7 which effects the suction of the air and the first compression of same, simultaneously with the discharge of the gases from the turbine. The compressed air passes into the scavenging and inlet manifold 9.

It is to be noted that in the above diagrammatic description of the cycle of the engine, only one inlet valve 21 and one inlet port 111 have been considered and illustrated. Of course, the inlet ports (and valves) can be more than one, depending upon the specific requirements of the engine.

From the above description it appears evident that the engine according to the invention performs a cycle in which a characteristic feature resides in the fact that there is not provided for any partialization (subdivision) of fluid flow neither in the exhaust manifold, nor in the scavenging and inlet manifold, since the distribution system of the engine is calculated and dimensioned in such a manner that at any speed and at any feed rate of the fuel, the inlet of fluid from the scavenging ports 110 and from the inlet ports 111 into the cylinder begins when the inner pressure is almost equal to the pressure in the inlet manifold. The pressure in the inlet manifold varies according to a well established curve, and whenever, due to external causes, it should reach a value greater than the predetermined value for a determined number of revolutions, a central control unit controls the opening of the air valve 13, which re-establishes the desired pressure value.

To summarize, the characteristic features of the described cycle are the following:

(1) The flow of the fluids entering and going out of the cylinder is absolutely unidirectional, and is not inverted at any time or position of the piston.

(2) The essential condition for the realization of the mentioned type of flow is that the opening of the scavenging ports and inlet valves takes place when the pressure upstream and the pressure downstream of them are practically equal and the variations, both in increase and in decrease, of the difference of pressure between the inlet ducts and the interior of the cylinder are continuous and gradual, this being a very important feature since this difference practically promotes and accompanies the displacement of the fluids: in the known prior art, the flow of the fluids gives origin to vortexes and to motions of the fluids in a plurality of directions.

(3) The energy yielded to the turbosupercharger by the burnt gases which leave the cylinder and continue their expansion in the turbine is recovered, with the normal and obvious losses, in the fresh fluid at the inlet manifold, this fluid being precompressed and having the capability of "sweeping" almost completely the interior of the cylinder, thus pushing off the combustion gases, by "bearing against" said gases without mixing with them, due to the different densities.

From the above it is apparent that the inflow of fluid into the combustion chamber is never partialized (subdivided): in the combustion chamber there enters the whole quantity of fluid supplied by the turbine, less the scavenging air, which flows out immediately through the exhaust ports. Consequently, the variation of power, controlled by means of the accelerator, takes place only by acting on the delivery of the fuel, as it will be better seen after, obtained by varying the moment at which the injection starts, and never the moment at which it ends, while the ratio air/fuel in the mixture is not modified.

The fuel injection apparatus 14 (see FIGS. 9 to 13) comprises an injection pump 25 which takes its drive from the crankshaft with a fixed drive ratio of 1:1, in consideration of the fact that the pump shaft must effect the same number of revolutions as the crankshaft. As it appears from FIG. 1, the driving pulley 22 of the injection apparatus 14 is driven by a belt 23 which is driven by a pulley 24 coupled to the crankshaft.

The pulley 22 actuates the pump 25 which sucks the fuel (gasoline) from the fuel tank through the filter 26 and forces it into the pipe 27 which feeds the single injection units; the exceeding fuel passes through a pipe 28 which collects also the fuel discharged from the discharge valve (as it will be described later) and the fuel deriving from leakages, and conveys it back into the fuel tank (not shown).

The shaft 29 projecting out of the pump 25 presents a splined head portion which is coupled in axially slidable manner with a sleeve 30 carrying an outer disc-shaped portion 31 the periphery of which is engaged by th fork 32 which is shiftable forwards the backwards in a direction parallel to the axis of the shaft 29, said fork carrying at its ends a pair of idle rollers 33 to engage the said disc 31 in a frictionless manner. The axial movement of the fork 32 is controlled by an actuation rod 34.

Co-axially to the sleeve 30 and to the disc 31 and integral in rotation therewith there is provided a further sleeve 35 which presents inner helical or anyhow inclined grooves for the coupling with an outer toothing at the end 36 of the camshaft 37. The control fork 32, through the actuation rod 34, can be moved forward and backward both when the camshaft 36 is rotating or it is at standstill and in this manner the angular position between the driving shaft 29 and the camshaft 36 can be modified at will thus obtaining an advance or retardation in the fuel injection. Each injection unit 38 (see particularly FIG. 10) comprises a cylindrical hollow body or cylinder 138 which receives the fuel from the pipe 27 through a nonreturn valve 40. The cylinder 138 is provided at its closed top end with another nonreturn valve 41 which permits the delivery of the fuel from the interior of the said cylinder 138 through the pipe 16 to the injector 15. Opposite to the inlet pipe 27, the cylinder 138 presents a discharge valve 42 for the purposes which will be described after. At the interior of cylinder 138 there is slidably mounted a small piston 43. The downward movement of the piston 43 creates a hollow space at the interior of the cylinder 138, said hollow space being immediately filled by the fuel entering through the inlet pipe 27 (and valve 40), while the upward movement of the piston 43 forces the fuel under pressure to flow out through pipe 16 (and valve 41) and, if the case, through the discharge valve 42.

The piston 43 is urged downwardly by the spring 44 acting on an annular step 143 of the piston itself and on a corresponding enlarged portion 238 of the cylinder 138. At the enlarged diameter base portion of the piston 43 there are provided two diametrally opposed projections 243 which engage corresponding longitudinal slots 45 obtained in the cylinder 138, said projecting portions 243 bearing on two corresponding slide members 46 which present at their bottom side an inclined plane surface 146 (see particularly FIG. 11) which cooperates with similarly inclined surfaces 147 obtained on the control rods 47 so that longitudinal movement backward and forward of the control rods 47 (actuated by the accelerator) will promote the upward or downward movement of the slide members 46 which control and determine the downward stroke of the postion 43 thus defining the exact volume of the fuel which will fill the cylinder 138.

Bearing upwardly against the bottom of piston 43 there is provided the spring 48 which by its other end bears against diametrally opposed projecting portions 149 of the fork-shaped roller-carrying member 49, which carries a freely rotatable cam follower roller 50 bearing against the cam 137 of the camshaft 37. The projections 149 are slidably guided in the same longitudinal slots 45 of the cylinder 138 inside which there slide the projections 243 of the piston 43. The roller-carrying member 49 presents an upwardly directed abutment head 249 which is intended to cooperate with the bottom end of cylinder 43.

The fuel injection stroke takes place in the following manner:

Rotation of the camshaft 37 (at the same angular speed as the crankshaft) promotes, through the cam follower roller 50 bearing on the cam 137, the lifting of the roller-carrying member 49 against the action of spring 48 which is compressed but does not displace upwardly the piston 43 due to the counterpressure of the fuel in the upper hollow space of the cylinder 138 and to the counter action of the spring 44 which urges the piston downwardly. The lifting of the piston will take place only when the abutment head 249 of the roller-carrying member 49 will abut against the bottom of cylinder 43, pushing same upwardly: from this moment, further upward movement of the roller-carrying member 49 promoted by the profile of cam 137 will cause the lifting of the piston 43 which will force the fuel to flow out through the delivery duct 16 (and valve 41). After having reached the peak point (determined by the profile of cam 137) the piston 43, which has ejected the desired dose of fuel from cylinder 138, starts its descent until it abuts against the slide members 46, while a new dose of fuel is introduced in the hollow chamber formed in the cylinder 138 thanks to the force-feeding through the inlet pipe 27 (and valve 40). The roller-carrying member 49 continues its descent, since it is maintained by spring 48 in constant contact with cam 137.

The discharge valve 42 which serves for the dosing and discharge of the fuel from the hollow chamber in cylinder 138 will not be described in detail, with particular reference to FIG. 12. Said valve 42 comprises a cylindrical hollow body 51 at the interior of which there is mounted axially slidable a piston-like member 52 which carries at its end a closure needle 53 which cooperates with a correspondingly shaped valve seat 54 on the wall of cylinder 138, for controlling the closure and opening of the passage 55 from the interior of the cylinder 138 to the discharge chamber 142 of the valve 42, which chamber 142 is connected through outlet port 242 and a suitable pipe (not shown) to the fuel tank. Normally, the passage 55 is closed by the needle 53 since the piston member 52 is urged to the closure position of the needle valve under the action of a spring 56 bearing at one end against a flanged portion 152 of the piston member 52, and at the other end against the head portion 157 of the movable core 57 of the electromagnet 58, axially aligned with said piston member 52 and closure needle 53.

When the engine is not running and the central control unit does not feed current to the electromagnet 58, the core 57 can move at the interior of same, and the spring 56 results to be stretched. When the central control unit feeds current to the electromagnet 58, this latter tends to expel the core (more or less depending upon the amount of current) and therefore the spring 56 is correspondingly more or less loaded: as a consequence, a more or less greater counterpressure of the fuel inside the cylinder 138 will be required to overcome the force of the spring 56 to move the needle 53 away from the valve seat 54 and to open the passage 55. Moreover, since the bearing surface of the spring 56 is more or less spaced with respect to the bore 55 depending upon the amount of current fed to the electromagnet 58, the opening movement of the needle 53 (and the opening degree of the needle valve) will be proportional to the displacement of the said bearing surface (at constant values of pressure of the fuel).

The central control unit determines the amount of current to be sent to the electromagnet depending upon the pressure and temperature in the inlet ducts to the cylinders and upon the temperature of the cylinder head: in other words, the central control unit constantly controls the ratio of air and fuel while leaving unaltered the difference of said ratio between the layers of the mixture in its stratified condition at the interior of the cylinders (as described above with particular reference to FIG. 8), difference which originates from the contours of the cams which control the inlet valves 21 and of the cams which control the stroke of the pistons 43 of the injection units 38, as well as by the position of the accelerator. Consequently, the electromagnet 58 acts in such a manner that into the cylinders 19 there is fed a mixture which is more or less "poor" depending upon the conditions of operation of the engine and of the air which is mixed, but said mixture is always stratified in a continuous manner starting from the moment in which the injection begins up to the closure of the inlet valves, when also the injection terminates.

The above described injection unit feeds the fuel under pressure through pipe 16 to the injector 15 arranged in the inlet duct 11. The pipe 16 is constantly filled with fuel under pressure so that, whenever the injection unit creates a pressure the value of which is equal or greater than the predetermined pressure value for opening the injector, this latter starts spraying the fuel into the inlet duct.

An injector nozzle particularly adapted for use in the engine according to the invention is illustrated in FIG. 13. The nozzle 115 of the injector 15 is arranged at the center of the inlet duct 11 at the beginning of the constriction zone of the Venturi tube designed for the inlet duct. The terminal portion of the nozzle presents a small spray bore located at the vertex of a cone which has a circumference of base coinciding with the extreme or tip circumference of the outer surface of the injector. Moreover, in front of the nozzle there is arranged a needle 59. In this manner the fuel which is sprayed out of the injector and expands into a plurality of small droplets is compelled, due to the conically shaped low pressure zone at the nozzle outlet, to assume the shape of a cone having as vertex the nozzle bore. The point of the needle 59 compels the droplets to deviate outwardly, so that they are compelled to arrange themselves on a conical surface. The droplets at the interior of the cone will be the first to be entrained by the air flow, since they present a lower inertial mass, and gradually all the other droplets, proceeding towards the exterior of the said cone of droplets, will be entrained. As above mentioned, this type of injector represents a preferred injector, although any other suitable injector of known type can be advantageously employed. Of course, the type of injector depends from the number of inlet ports 11 for each cylinder 19, the described type being particularly suitable for a cylinder with two inlet ports, so that the needle 59 is arranged at the division of the flow for each valve.

The ignition system is preferably of the capacitive spark type so that a better starting of the combustion is ensured under any operating condition.

The distributor which sends the signals to the electronic central control unit is arranged in the injection pump unit, connected to the camshaft. The said signal distributor sends, for each cylinder, an electric impulse with an advance with respect to the top dead center, equal to the maximum foreseen; the central control unit, having received the signal for a determined cylinder, transmits the ignition control to the cylinder with a degree of advance calculated by considering the number of revolutions, the temperature of the cylinder head and the feeding pressure.

Of course, it is not mandatory that the ignition distributor be directly connected with the injection pump; it must be however kept in mind that it is most useful that all informations relating to the conditions of the fluids and of the components and devices which realize the cycle be sent to a single central control unit which processes the said informations and sends the suitable actuation controls. In this connection, it must be kept in mind that the central control unit can be programmed in such a manner as to intervene in the formation of the mixture, that is on the amount of the injected fuel (with respect to the quantity by weight of the air admitted), on the temperature of the cylinder head, on the ignition advance, so that the said central control unit automatically programmes and selects the optimum of the various partial unit efficiencies so as to obtain a global efficiency which is very near to the maximum which can be obtained in the internal combustion engines.

The lubrication system of the engine is diagrammatically described with reference to FIG. 14, in which a double-casing pump 60-61 sucks the oil from the oil pan at the bottom of the crankcase, through the oil strainer 63, and sends it under pressure to the filter 64 from which filter the oil is sent to lubricate the several engine parts. At the bottom of the oil pan there is provided a heat sensor 65 which senses the temperature of the oil in the oil pan and signals it to the central control unit. Whenever the oil temperature increases beyond a predetermined value, the central control unit controls the deviation of the oil flow through the electrically controlled four-way valve 66 so that the oil delivered from the first pump casing 60 is sent to the oil cooler tank 67 which contains a relatively large quantity of cool lubricant oil. At the same time, the central control unit inserts the second pump casing 61 which sucks the same quantity of oil from the cooler tank 67 and sends it under pressure, through valve 66, to the filter 64 and hence to the lubrication circuit.

Referring now to FIG. 15, an advantageous method of lubrication of the pistons is shown, in which in the cylinder block 119, at the bottom of the cylinder 19 below the scavenging ports 110 and the exhaust ports 105, all around the circumference of the cylinder there is obtained an annular duct 219 which receives the lubricating oil under pressure and forces it out toward the moving piston 20 through a plurality of radial bores 319 which pass through the cylinder wall. In this manner, the piston 20 is lubricated and cooled in a complete and efficaceous manner along its whole height from the zone of the piston rings (bottom dead center) up to the top dead center.

The cooling system will now be particularly described with reference to FIGS. 16 to 19.

Firstly, it is to be noted that the cooling liquid is the same oil which is used in the lubrication system, so that the same oil tank 67 containing cool oil will be used. The cooling oil contained in the cylinder block (see FIGS. 16 and 19) is in direct contact with the cylinder 19 in the form of a very thin layer. The cylinder 19 is fitted inside a jacket 68 defining four spirally shaped ducts 168 angularly spaced of 90° for each cylinder 19, each spiral duct 168 enveloping the cylidner of 180°. The oil contained in each spiral duct 168 and which is in contact with the heated cylinder 19, becomes heated very quickly and therefore it flows upwardly along the spiral duct until it reaches the cylinder head 4 where it is mixed with the oil from the other cylinders and from which it enters into a finned cooling pipe 69 where it is cooled and flows down to the bottom of the cylinder block where it is again reinserted in the cooling cycle. For each cylinder there is provided a finned cooling pipe 69.

Whenever the temperature at the interior of the cylinder head 4 increases beyond a predetermined value, a suitable sensor (non shown) gives a signal to the central control unit which feeds current to a double-casing electrically operated pump 70. One casing of the pump 70 then sucks oil from the cylinder head 4 and sends it to the cooler tank 67, while the other casing of the said pump 70 sucks oil from the bottom of the said cooler tank 67 and sends it to the lower inlets in the cylinder block 119 where it is inserted in the cooling circuit of the cylinders 19, as above described.

A particular type of supercharger, suitable for engines having more than three cylinders, is illustrated in FIGS. 20 to 24. The engine 101 illustrated in these Figures is a six cylinder engine, the cylinders being arranged in V-disposition at 60°. In the central portion between the two lines of cylinders 202 there is arranged the supercharger which presents its shaft 71 parallel to the lines of cylinders. Forwardly there is arranged a blade fan 72 which is ducted inside a duct 172 at the inlet mouth of which there is arranged the air filter 272. After the blade fan 72 there is arranged a stator 73 which deviates the air flow onto an endless multi-start screw 171 which presents a length equal to the length of the central shaft 71. The stator 73 serves as support for the rotating shaft 71, and the screw 171 has its threads obtained of one piece with the shaft 71 and it is constructed in very light material, perferably resin and carbon fibres, with its outer surface perfectly smooth and vitrified, while the blade fan 72 is keyed to the shaft 71 and it is also constructed with very light material. The casing 172 is conical with its conicalness directed rearwardly and varied in its different sections, and terminates where there is arranged the end bearing 271 for the shaft 71 and the pulley for the electric starting motor. Axially aligned with the above described blower there is arranged, immediately after the cylinders of the engine, the turbine 106 which has its hub 206 keyed on the same shaft 71 of the blower. From the hub 206 there radially depart the spokes 306 carrying an outer rim 406 which presents a row of blades 506. The rim 406 is made of very light material, preferably carbon fibre. All around the rim 406 carrying the blades 506 there is arranged the casing 606 made of heat-and-oxidation resistant material and which envelopes the rim, the tight seal being ensured by circumferential packing rings made of anti-friction material and embedded in the rim 406 itself. The said casing at one side presents the blowing nozzles 205 connected with the exhaust manifold, and at the other side it presents the discharge pipes 305 to be connected with the exhaust pipe. In the zone of the supercharger where it is arranged the screw 171, there depart from the casing 172 two pipes for each cylinder, of which the first pipe 110 conveys the scavenging air to the scavenging ports, while the second pipe 211 conveys the air to the inlet ports.

The above described supercharger system permits to feed the different inlet and scavenging ducts of the several cylinders without the creation of any interference between one another, which could modify the fuel-air ratio and the mixture intake in the cylinders. It is also possible to utilize a supercharger of the so-called "COMPREX" (trade mark) type, driven by the crankshaft: in this latter case, for the starting of the engine, there is provided a compressed air tank (not shown) which supplies the air at the correct pressure during the initial starting phase of the engine, until the supercharger has reached its operational speed, at which moment the flow of air from the compressed air tank will be stopped, and the tank itself will be again charged for the next starting operation. The said operations are controlled through suitable pressure sensors (not shown) which send their informations to the central control unit. The said pressure sensor can inform the operator prior to the stopping of the engine, about the pressure value in the compressed air tank, thus giving the possibility, in case of low pressure, to continue the running of the engine just to increase the air pressure in the said tank and have it suitably filled for the next starting of the engine.

The starting system which has now been described can be adopted in any type of engine employing a supercharger connected to the driving shaft, such as for example a Roots blower of known type.

Figure 26:
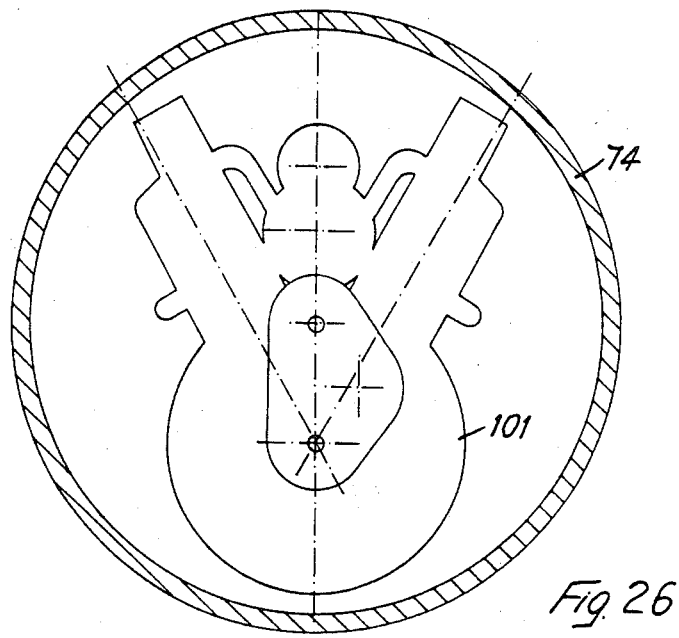
FIG. 26 is a transversal section of the ducted engine of FIG. 25.

With reference to FIGS. 25 and 26, the engine 101 together with the oil cooler tank is ducted at the interior of a hull casing 74 which is tight sealed and thermically insulated. The said casing 74 presents at its fore end a circular air intake inside which there is mounted for rotation a ducted propeller 75. Ahead of the ducted propeller 75, on the same axis, there is provided a variable-pitch driving propeller 76. The two propellers 75 and 76 are counter rotating. The movement of the airplane and the two counter rotating propellers 75 and 76 create at the interior of the casing 74 an air flow presenting a pressure which is greater than the atmospheric pressure which enters into the intake of the supercharger, thus leading to the creation, at the interior of the inlet and scavenging ducts, of a greater pressure. Moreover, the said air flow, by quickly lapping the heat exchanger of the inlet ducts, causes a remarkable decrease of the temperature of the inlet air so that the weight percentage of the charge of each cylinder increases still more.

The output of the turbosupercharger is further increased by the fact that the counterpressure at the discharge is practically irrelevant, because the casing 74 terminates where the air flow reaches its maximum speed, thus rendering the discharge more easy.

The above factors concur to the supercharging of the engine at low flight altitudes and particularly at the take-off.

Figure 27:
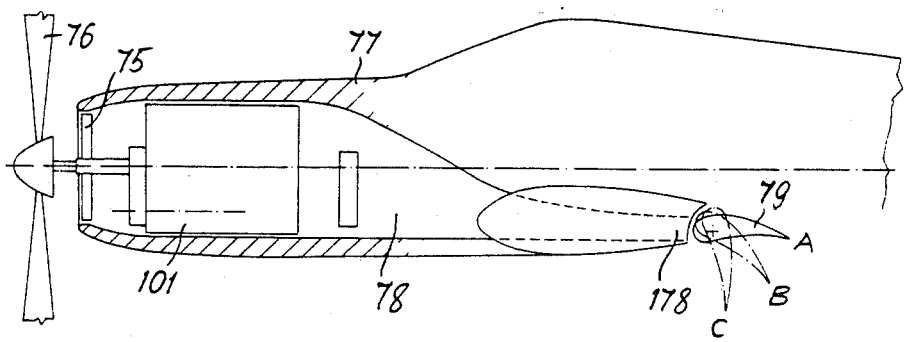
FIG. 27 is a diagrammatic side view, with parts in section, of a portion of the fuselage of an aircraft with a ducted engine.

A partiuclar installation of the engine according to the invention in a single engine low-wing monoplane is shown in FIGS. 27 in which there is shown the fore portion of the fuselage 77 of a single engine low-wing monoplane in which the engine 101 is ducted in a duct 78 conveying the air and exhaust gases to a discharge outlet closed by a flap 79 hinged to a wing spar and which can be angularly moved like a usual flap. When the said flap 79 is in line with the chord as shown in full line (position A), it keeps open a slot along the whole upper portion, from which slot air and gases stream out which lap the upper chamber of the flap and create a lift component and a thrust in the direction of movement of the aircraft. When the flap is swung in the take-off position (position B in dash lines), it closes partially the upper slot and it opens a greater central slot from which streams out a major flow of air which is directed downwardly by the flap 79 and it thus creates an upwardly directed thrust. If the flap 79 is swung into the landing position (position C in dash lines), it closes completely the upper slot thus conveying the whole flow of air and gases in a downward direction and creating the maximum upward directed thrust.

In FIGS. 28 and 29 there is diagrammatically illustrated the gearing of the tractor propeller 76 and of the ducted propeller 75. The tractor propeller shaft 176 is driven by a gear 276 which meshes with a gear 376 keyed on the driving shaft 80 of the engine. The ducted propeller shaft 175 is a hollow shaft at the interior of which rotates the tractor propeller shaft 176, and is driven by a gear 275 meshing with an intermediate gear 375 which finally meshes with gear 475 keyed on the driving shaft 80. The first gear train 376-375 provides for reduction of the number of revolutions of the variable-pitch tractor propeller 76, so as to obtain the maximum output; the second gear train 475-375-275 increases the number of revolutions of the ducted propeller 75 with respect to the driving shaft 80, and invertes the direction of rotation of the hollow shaft 175 with respect to the inner shaft 176 so that the two propellers 75 and 76 are counter rotating.

An electro-injector 81 which is particularly adapted for the best utilization of the supercharging obtained with the engine according to the invention, will be now described with reference to FIG. 30. The electro-injector 81 is arranged in the inlet ducts, and the central control unit controls its operation so that the electro-injector will be caused to intervene just when the intake air pressure is greater than the peak point predetermined in the curve of variation of the pressure in the ducts in relation with the number of revolutions. Whenever this condition takes place, the central control unit, instead of opening the discharge valve which controls the said pressure (discharge valve 13, FIGS. 1 and 2), feeds current to the electro-injectors 81 causing the injection of fuel if the over-pressure is contained within a predetermined range, or the injection of distilled water if the over-pressure is above the predetermined maximum. Inversely, when the pressure decreases or the fuel from the pump is reduced, then the central control unit stops the current to the electro-injectors 81 and shuts off the additional feeding circuit.

Each electro-injector 81 is arranged at the beginning of the Venturi tube of the inlet ducts. The fuel to the electro-injector 81 is fed through a pipe 83 and a nonreturn valve 183, an electrically operated valve 283 being provided for controlling the opening or closing of the fuel flow. Similarly, the distilled water is fed to the electro-injector through a pipe 84 and a nonreturn valve 184, an electrically controlled valve 284 being provided for the opening and closing of the water flow. Each electro-injector 81 consists of a cylindrical body 82 which is hollow and at the interior of which there is axially slidably mounted the piston valve 85 the movement of which is controlled by the electromagnet 86 controlled in turn by the central control unit. The piston valve 85 presents an inner duct 87 which opens at its bottom in the form of a spray nozzle 88 and is normally closed since the piston valve 85 is urged downwardly under the action of spring 89 against a closure needle 90.

When the piston valve 85 is in its lower closing position, the spray nozzle 88 of duct 87 is closed by needle 90 and a hollow space 91 is created at the interior of cylindrical body 82. The said hollow space 91 is filled with liquid (fuel or water). Upon energizing of the electromagnet 86, the piston valve 85 is lifted, thus compressing the liquid inside space 91 and causing its outflow through duct 87 and nozzle 88, where the liquid is sprayed under the form of a plurality of droplets which are distributed along a conical surface, also thanks to the presence of the suitably shaped needle 90. At the beginning, the opening of nozzle 88 will be minimum, then, as the piston valve 85 cotinues its upward stroke, the opening of nozzle 88 will progressively increase with a consequent increase in the delivery of liquid towards the end of the stroke which coincides with the final phase of closure of the inlet valves in the engine cylinders. In this manner there is obtained the creation of a more rich mixture in proximity to the spark plugs, similarly to what has been done in the case of normal injection.

The central control unit sends current to the electromagnet 86 with an intensity which is directly proportional to the number of revolutions of the engine at that moment.

The central control unit operates upon receiving suitable signals from a distributor arranged on the same shaft of the injection system, said distributor interrupting the signal to the central control unit after about 90°, i.e. when the inlet valves are closed, so that simultaneously also the current to the electromagnet 86 is interrupted, whereby the piston valve reverses its stroke and goes downwardly under the action of spring 89, closing the nozzle 88 and again creating a hollow space 91 for the liquid. The piston valve 85 will reach the maximum of its discharge stroke (against the action of spring 89) only if it receives the maximum current from the central control unit, which will happen only when the motor reaches its maximum number of revolutions. Otherwise, the electro-injector 81 will inject just a portion of its content.

Whenever the central control unit receives from a suitable sensor the signal that the temperature at the cylinder head has reached predetermined maximum levels and also the engine has reached a predetermined maximum number of revolutions, then a control is issued to close the fuel valve 283 upstream of the nonreturn valve 183 and to open the distilled water valve 284 upstream of the nonreturn valve 184.

The distilled water is contained in a small tank housed at the interior of the cooler tank for the oil, and it is forced out of this tank, through pipe 84, under the action of the pressurized air coming from the intake ducts, since the inlet ducts communicate through a small pipe with the upper portion of the distilled water tank. In this manner the duct 84 is always filled with distilled water at the same pressure as the air in the intake ducts.

The insertion of the electro-injectors 81 in the fuel injection system is controlled by the pilot whenever desired.

The thermodynamic cycle as above described can be performed also by an internal combustion engine of the spontaneous ignition type, by modifying the fuel feeding system and by providing a combustion prechamber, inside which the fuel is directly injected. The fuel injection inside the prechamber is started prior to the top dead end, of a time period which is variable depending upon the amount of fuel to be injected. The starting of the injection will be more advanced if the quantity of fuel to be injected is greater, and the injection will terminate beyond the top dead end, at a point which will be the farther beyond depending upon the greater amount of fuel to be injected.

The fuel injection will take place by utilizing an injection apparatus similar to that above described with reference to the spark ignition system, with the modification consisting in the fact that the phase governor is shifted together with the power governor (accelerator) so as to shift the end point of the injection, which otherwise would remain fixed, in such a manner that the said end point is shifted with respect to the top dead end according to the quantity of fuel to be injected.

Moreover, the contour of the cam which controls the stroke of the piston in the fuel compressor is calculated in such a manner that the injection pressure increases with an almost linear progression, in order to compensate the counterpressure which the fuel will meet by expanding inside the prechamber.

The discharge valve (similar to the discharge valve 42 of FIG. 12) is controlled by the central control unit in relation with the temperature inside the prechamber and with the number of revolutions. The lesser is the temperature, the greater will be the amount of fuel discharged; the lesser is the number of revolutions, the greater will be the amount of fuel discharged.

In the present invention, the thermodynamic cycle develops in two means, namely:

a rotating motion means wherein take place intake and first portion of compression phase. After having been properly cooled by means of a heat exchanger, pressurized air enters into the reciprocating motion means—by passing through the valves housed in the cylinder-head and through an inlet port, obtained in the cylinder bottom section. The inlet port is positioned in the semicircumference opposite to the one wherein the exhaust port is placed. The entering air is provided at the same pressure as the burned gases in the cylinder and pushes ahead the burnt gases towards the exhaust. Inside this means take place the second portion of compression phase, almost at the end of which, considering the engine version fed by a fuel suitable for a progressive combustion, starts the fuel injection into an originally conceived thermically insulated chamber, as shown in FIGS. 31-36.

The fuel is injected at a pressure and flow rate increasing little by little and in proportion to the air pressure in the feeding ducts up to the top dead center. Afterwards the pressure and flow rate are decreasing up to resulting of no value after that the crankshaft has performed a little higher rotation in respect of that during which the starting portion of injection itself took place, before the top dead center.

From here starts the expansion phase, continuing until the piston starts opening the exhaust port from which the burnt gases come out. These gases are conveyed to a turbine wherein occurs the last portion of expansion and then the exhaust in the atmosphere.

By continuing its expansion stroke, the piston increases the exhaust area up to bottom dead center and a little before reaching it opens the scavenging port from which enters the pressurized air that has the same pressure of that passing through the feeding duct which enters into the cylinder through the valves.

The above occurs at any running, so obtaining the cutting of the thermodynamic cycle in a P.V. (pressure-volume) diagram, with a segment which results parallel to the axis of abscissas. The cycle portion which remains under said segment—that is that at lower pressure—develops inside the rotating motion means, the one above said segment, i.e. that at higher pressure, develops inside the reciprocating means, this last changing thermal energy into mechanical one.

The engine-members that carry out the cycle, and the cycle itself, are just the same either in the self-ignition engine version or in the sparking-plug ignition one, excluding the mixture generating phase and combustion phase.

In the self-ignition version the mixture is generated and hit in the following way (see FIGS. 33–36):

the piston 699 in its upwards stroke pushes the air from inside the piston cylinder 700; by entering into the central cylindrical area 701 and into the outside crown 702 of the combustion chamber 800 at the same time, the air is pressuring the burnt gases contained therein in the top area (FIG. 33). A little before the piston 699 reaches the top dead center, the injection means 703 start injecting the fuel that, as it happens in the gasoline fed engine version, set itself on a cone-shaped surface 704 that goes to strike the metallic cylinder 705, at high temperature, in its central area 701, wherein combustion starts.

The fuel inlet at high pressure and its further combustion do stop the air inlet into the central area 701 at first; then, since it continues to be pushed upwards, it enters into the crown 702 only, also because it is piped from the top so creating a rotative motion around the metallic cylinder 705 (see FIG. 34).

The gases, while combustion is continuing, come out from the bottom of the cylinder 705, wherein they found the air current rising towards the crown 702 and rise together with it, reach the top section by flowing between the metallic incandescent cylinder and, at the outside, the insulating wall 706 which, consequently, is always warmed (FIG. 35). From here they come again to the central area 701, wherein they mix with the fuel—this last being still injected and that hits since it finds a high temperature room with air in excess and sensibly moving.

Such a rotary motion around the metallic cylinder 705 carries on for some degree after top dead center, when begins to make itself felt the piston expansion effect, that stops circulating motion and consequently the fuel, that is continuing to enter, is burning while going towards the piston cylinder 700, wherein the combustion diverges towards the outside (FIG. 36).

The fuel injection stops as soon as the crankshaft has performed one rotation, after the top dead center, greater than the one performed before top dead center, at the starting of injection itself.

Both injection starting and stopping points, astride the top dead center, are variable according to power output requirements, but the ratio existing between the rotation angle during which the whole injection stroke take place and the rotation angle during which the injection portion before top dead center is performed remain unchanged at any running.

In other words, the injection time is the maximum at full power and is reduced as power requirements are reduced, standing however always astride the top dead center, in the same proportions between the distance before and after the top dead center.

The engine members that carry out the different cycle phases in the way as described above are:

the reciprocating motion means, as described above and claimed in the U.S. patent application Ser. No. 373,284 and now U.S. Pat. No. 4,463,566, of the same inventor, inclusive of the special cooling and temperature homogenizing circuits, the lubricating one, the exhaust manifold and the feeding and scavenging one, with the relevant heat-exchanger with the same injection pump means, including discharge valve means, but with the variation of the cylinder-head and of the injector positioning both having been thought, in this case, as stated in FIGS. 31–36.

The very special cylinder head foresees two air inlet valves 707, housed in the area wherein the cylinder-head itself looks parallel to the piston head, while in the area which is comprised between the two valves and the opposite semicircumference a cylindrical shaped room is obtained—(see FIGS. 31 and 32)—opened towards the piston cylinder 700, on which is mounted a high temperature resistant ceramic combustion chamber 800—or made out of equivalent material; in its shaped head 708, in the central area, is placed the injector 703 that differs from the one disclosed in the U.S. patent application Ser. No. 373,284 and now U.S. Pat. No. 4,463,566, to which reference is made, only as to the position of the pin 709, whose function is to originate the conus of the little drops during spraying action, this pin being connected to the injector itself instead of to the duct and being placed in a highly heated chamber 800. Inside this chamber 800 is placed the wolfram or equivalent material tube 705 that is kept in its place by two blades 710 and 710' connecting it, at the same time, with the current tap and grounding 711 and 711'. In this original chamber 800 it is obtained mixture generation, its ignition and combustion, its components being in continuous, never whirling (vorticose) motion.

The rotating motion means are same type as disclosed above and in the U.S. patent application Ser. No. 373,284 and now U.S. Pat. No. 4,463,566, to which reference is made, that bears the electrical motor at high number of revolutions fitted on the shaft connecting the turbine with the booster compressor. The function of this electrical motor is to start the engine and to operate now and then in some particular moment, at minimal foreseen runnings.

At last the injection pump and the injector are the same as foreseen in the U.S. patent application Ser. No.

373,284 and now U.S. Pat. No. 4,463,566, of course with variations due to higher pressure, which is needed in this case, excluding the phase adjustment system (see FIG. 9, ref. from 30 to 36) that, in this case, is connected with the power variation control - accelerator—(see FIG. 9—ref. 47) just to advance injection end in proportion with the delay by which the same accelerator has drawn the injection starting.

Figure 31:
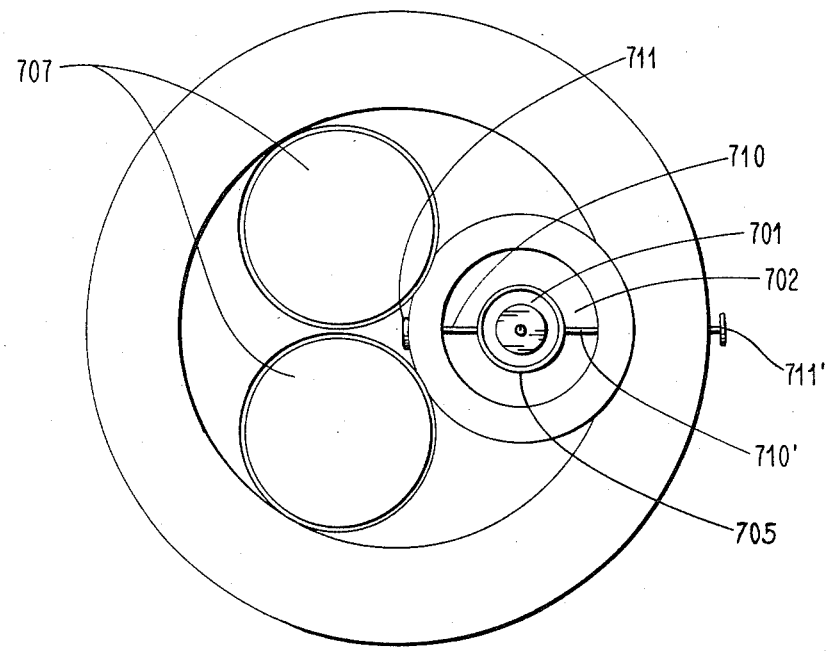
Figure 32:
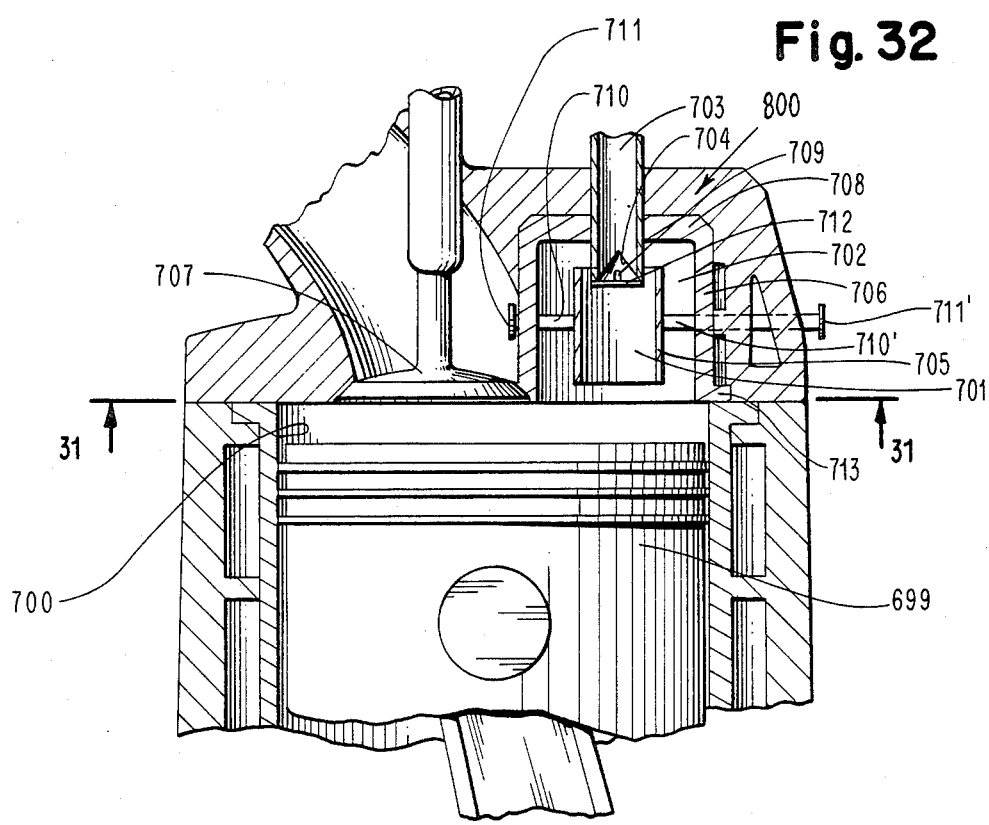

The engine-members included ex-novo or modified in respect to those being part of the engine version gasoline fed and sparking plug ignited are as follows:

the chief one, originally and purposely conceived to carry out the thermodynamic cycle when gas-oil type or kerosene fuels are intended to be used, is the cylinder-head, which is flat type in this case. In the cylinder head are housed the two feeding valves 707, as well as the original mixture generating and combustion chamber 800. Such chamber 800 consists of a ceramic cylinder 706—or made out of other similar insulating material—closed in the head as shown in FIGS. 31 and 32. Axially to it is positioned the injector 703, whose outlet 704 is cone-shaped. At the injector base the traverse bar 712 is inserted, this being the support for the pin 709 that, in this way, results placed in front of the fuel hole outlet, so contributing to better atomization of the fuel drops and, at the same time, to compel them to spread on a conical surface 704 meeting the tube or cylinder 705 in its central area.

The tube 705 consists of a thin wolfram sheet (or other material offering similar features) which is kept in place by two sheets of the same material, ref. 710 and 710', one of which being connected with the current tap ref. 711' and the other being grounded (see ref. 711). Due to the passage of the electrical current from 711 to 711' the tube or cylinder 705 becomes incandescent, hitting in this way the air-and-fuel mixture striking it, and continues in helping the combustion of same mixture, while this turns around it passing from the central area 701 to the crown 702. As soon as the cylinder is in incandescent condition, the electrical current stops passing through.

During compression phase, as said above, the piston compels the air to enter into the central area 701 of the cylinder 705 and crown 702, but as soon as the injector 703 starts spraying, at first it slows up the air inlet into the central area 701 of cylinder 705 and calls back air from the crown 702 adjacent the head 708; then rotating motion is more and more increasing while it is continuing the inlet of fuel, which hits while going downwards, where it is deviated and piped in the crown 702 by the fluids flow tending towards this crown.

The ceramic chamber 800 is driven into the casting forming the cylinder head, being kept in place by the turned edge 713. It is cooled in the outside by being in touch with the casting that forms the cylinder-head and by the passage of the coolant, while its inside is always kept at a high temperature since it consists of insulating material and because the burnt gases stagnate therein for a longer time and the air enters only when being at a high temperature. The wolfram tube or cylinder 705 keeps a high temperature because it is warmed by the electrical current, when its temperature is lowering under a certain limit, and remains fully immersed among the gases during combustion phase.

It is believed that the invention will have been clearly understood from the foregoing detailed description of some preferred embodiments. Changes in the details of construction may be made without departing from the spirit of the invention, as above described and as claimed hereinafter.

We claim:

1. An internal combustion engine for performing a thermodynamic cycle with substantailly complete combustion, comprising:

a rotating motion means including an electric motor on a connecting shaft between two rotors of a turboblower;

a reciprocating motion means for transforming thermal energy into mechanical energy including a crankshaft, a cylinder having a scavenging port and an inlet valve, a piston connected to said crankshaft and slidably received in said cylinder, a separate combustion chamber for generating and burning a fuel mixture communicating with said cylinder, and means for injecting fuel into said combustion chamber during rotation of said crankshaft through a predetermined rotation angle, said rotation angle varying according to power output requirements but always situated astride a top dead center position of said piston within said cylinder, fluid flow entering and exiting said cylinder being substantially unidirectional; and said internal combustion engine further including means for pressurizing air for inlet into said cylinder to a pressure substantially the same as pressure of burned gases inside said cylinder when said port and valve start opening.

2. An internal combustion engine for performing a thermodynamic cycle, comprising:

a rotating motion means including an electric motor on a connecting shaft between two rotors of a turboblower; and a reciprocating motion means for transforming thermal energy into mechanical energy, said reciprocating motion means including a piston receiving cylinder and a cylinder head for sealing said cylinder, said cylinder head housing a mixture generating combustion chamber separate from but fully open towards said cylinder, said chamber being thermically insulated and containing a heatable member open at opposed ends for initiating the ignition of a fuel mixture which, in a first portion of a combustion phase, circulates repeatedly around said member through said open, opposed ends before entering into said cylinder for complete combustion.

3. The engine of claim 2, wherein said cylinder head includes in addition to said mixture generating combustion chamber two air inlet valves disposed adjacent to a semi-circumference opposite to that including said chamber.

4. The engine of claim 2, wherein said combustion chamber is formed of a heat-resistant material and said chamber is driven into said cylinder head for thermal contact and cooling from the outside.

5. The engine of claim 4, wherein said heat resistant material is ceramic.

6. The engine of claim 2, wherein a fuel injector is disposed in a top wall of said chamber and a conical surface is provided extending within said heatable member, said fuel injector spraying fuel in the form of small droplets along said conical surface.

7. The engine of claim 6, wherein said fuel injector includes a pin disposed at an open end of said injector in the interior of said heatable member.

8. The engine of claim 2, wherein said heatable member is a metallic tube that is formed of heat-resistant material that may be electrically heated to an incandescent condition.

9. The engine of claim 8, wherein said metallic tube is formed of tungsten.

10. The engine of claim 8, further including two blades wherein said metallic tube is suspended substantially coaxially within said chamber by means of said two blades, said two blades also serving as current connectors for feeding heating current through said tube.

11. The engine of claim 8, wherein said metallic tube divides the interior of said chamber into a central cylindrical area and a coaxial outer crown, both being fully open towards said cylinder and having fluid communication with each other past an upper border of said tube for rotating motion of said fuel mixture around said tube along inside and outside surfaces of said tube.

12. An internal combustion engine for performing a thermodynamic cycle with substantially complete combustion, comprising:
- a rotating motion means including an electric motor on a connecting shaft between two rotors of a turbo-blower; and
- a reciprocating motion means for transforming thermal energy into mechanical energy including a crankshaft, a cylinder having a scavenging port and an inlet valve, a piston connected to said crankshaft and slidably received in said cylinder, a combustion chamber, for generating and burning a fuel mixture communicating with said cylinder, and means for injecting fuel into said combustion chamber during rotation of said crank shaft thorugh a predetermined rotation angle, said rotation angle varying according to power output requirements but always situated astride a top dead center position of said piston within said cylinder, fluid flow entering and exiting said cylinder being substantially unidirectional; said means for injecting fuel further including an electronically controlled mechanical pump and an injection phase adjustment system; said mechanical pump including a pump piston received in a pump cylinder; said pump piston having intake and compression strokes that are automatically adjusted in response to accelerator input (a) by limiting downward movement of said pump piston through engagement thereof with a stop member during the intake stroke thus assuring that only a selected quantity of fuel enters said cylinder and (b) by increasingly delaying the start of the compression stroke of said pump piston the smaller is the quantity of fuel to be pumped; said injection phase adjustment system being responsive to said accelerator input so as to maintain the end of the fuel injection astride the top dead center position of said piston connected to said crankshaft, a valve being provided in said mechanical pump to partially discharge excess fuel depending on feeding air pressure, temperature and engine revolution speed;

said internal combustion engine further including means for pressurizing air for inlet into said cylinder to a pressure substantially the same as pressure of burned gases inside said cylinder when said port and valve start opening.

* * * * *

UNITED STATES PATENT OFFICE
CERTIFICATE OF CORRECTION

Patent No. 4,722,309          Dated February 2, 1988

Inventor(s) Enzo Guidoboni; Paolo Guidoboni; Sergio Guidoboni

It is certified that error appears in the above-identified patent and that said Letters Patent are hereby corrected as shown below:

Col. 2

Line 64, delete "desription" and insert --description--.

Col. 3

Line 57, delete "cylnder" and insert --cylinder--;
Line 62, delete "signal" and insert --single--.

Col. 4

Line 8, delete "cylidner and insert --cylinder--;
Line 17, delete "Fgiure" and insert --Figure--;
Line 47, delete "exhasut" and insert --exhaust--;

Col. 6

Line 29, delete "th" and insert --the--.

Col. 7

Line 55, delete "not" and insert --now--.

UNITED STATES PATENT AND TRADEMARK OFFICE
CERTIFICATE OF CORRECTION

PATENT NO. : 4,722,309

DATED : February 2, 1988

INVENTOR(S) : Enzo Guidoboni et al

It is certified that error appears in the above-identified patent and that said Letters Patent is hereby corrected as shown below:

Col. 12

Line 11, delete "partiuclar" and insert --particular--.

Signed and Sealed this

Twenty-seventh Day of September, 1988

Attest:

DONALD J. QUIGG

*Attesting Officer*     *Commissioner of Patents and Trademarks*